(12) United States Patent
Wang et al.

(10) Patent No.: US 11,759,714 B2
(45) Date of Patent: *Sep. 19, 2023

(54) METHOD FOR IMPLEMENTING USER MATCHING AND RELATED DEVICE

(71) Applicant: TENCENT TECHNOLOGY (SHENZHEN) COMPANY LIMITED, Guangdong (CN)

(72) Inventors: Lei Wang, Shenzhen (CN); Tongtong Huang, Shenzhen (CN); Wu Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 23 days.

This patent is subject to a terminal disclaimer.

(21) Appl. No.: 17/374,792

(22) Filed: Jul. 13, 2021

(65) Prior Publication Data

US 2021/0339145 A1 Nov. 4, 2021

Related U.S. Application Data

(63) Continuation of application No. 16/411,676, filed on May 14, 2019, now Pat. No. 11,123,642, which is a
(Continued)

(30) Foreign Application Priority Data

Jan. 24, 2017 (CN) .......................... 201710060151.X

(51) Int. Cl.
*A63F 13/795* (2014.01)
*G06F 16/9535* (2019.01)
(Continued)

(52) U.S. Cl.
CPC ............ *A63F 13/795* (2014.09); *A63F 13/35* (2014.09); *A63F 13/352* (2014.09); *A63F 13/48* (2014.09);
(Continued)

(58) Field of Classification Search
CPC ...... A63F 13/795; A63F 13/352; A63F 13/48; A63F 13/35; A63F 13/57;
(Continued)

(56) References Cited

U.S. PATENT DOCUMENTS 6,754,832 B1 6/2004 Godwin et al.
7,280,975 B1 10/2007 Donner
(Continued)

FOREIGN PATENT DOCUMENTS

CN 104063574 9/2014
CN 104436655 3/2015
(Continued)

OTHER PUBLICATIONS

International Search Report dated Apr. 18, 2018 in International Application No. PCT/CN2018/072981 with English Translation.
(Continued)

*Primary Examiner* — Michael A Cuff
(74) *Attorney, Agent, or Firm* — ARENTFOX SCHIFF LLP

(57) ABSTRACT

A method for user matching is provided. A matching request is received from a client. The matching request includes an application identifier and a user identifier. When the application identifier indicates that a matching mode for the matching request is an asynchronous mode, a matching queue identifier is obtained based on the matching request, the user identifier is added to a matching queue corresponding to the matching queue identifier, a predetermined number of user identifiers is selected from the matching queue,
(Continued)

a matching result is generated that includes an identifier of a matching group of the selected predetermined number of user identifiers, and the matching result is sent to the client. The predetermined number of user identifiers includes the user identifier in the matching request.

20 Claims, 7 Drawing Sheets

Related U.S. Application Data continuation of application No. PCT/CN2018/072981, filed on Jan. 17, 2018.

(51) Int. Cl.
G06F 16/9536 (2019.01)
H04L 67/306 (2022.01)
A63F 13/352 (2014.01)
A63F 13/48 (2014.01)
A63F 13/35 (2014.01)
A63F 13/57 (2014.01)
H04L 67/131 (2022.01)

(52) U.S. Cl.
CPC .......... A63F 13/57 (2014.09); G06F 16/9535 (2019.01); G06F 16/9536 (2019.01); H04L 67/306 (2013.01); A63F 2300/53 (2013.01); A63F 2300/5566 (2013.01); H04L 67/131 (2022.05)

(58) Field of Classification Search
CPC ......... A63F 2300/5566; A63F 2300/53; G06F 16/9536; G06F 16/9535; H04L 67/306; H04L 67/38
USPC .......................................................... 463/42
See application file for complete search history.

(56) References Cited

U.S. PATENT DOCUMENTS

| | | | |
|---|---|---|---|
| 9,776,091 B1* | 10/2017 | Lebrun | A63F 13/35 |
| 10,286,327 B2 | 5/2019 | Xue et al. | |
| 2008/0256015 A1 | 10/2008 | Woolf et al. | |
| 2010/0088314 A1 | 4/2010 | Kuang | |
| 2010/0227691 A1 | 9/2010 | Karsten | |
| 2012/0040752 A1 | 2/2012 | Koo | |
| 2012/0094757 A1 | 4/2012 | Vago | |
| 2012/0302337 A1 | 11/2012 | Thakkar et al. | |
| 2013/0165234 A1* | 6/2013 | Hall | A63F 13/87 463/42 |
| 2014/0004960 A1 | 1/2014 | Soti et al. | |
| 2014/0274402 A1 | 9/2014 | Michel et al. | |
| 2015/0127565 A1 | 5/2015 | Chevalier et al. | |
| 2015/0148127 A1 | 5/2015 | Saraf et al. | |
| 2016/0001181 A1 | 1/2016 | Marr et al. | |
| 2016/0067601 A1* | 3/2016 | Mehra | A63F 13/798 463/11 |
| 2016/0166935 A1 | 6/2016 | Condrey et al. | |
| 2016/0243449 A1 | 8/2016 | Kunugi | |
| 2017/0011179 A1 | 1/2017 | Arshad et al. | |
| 2017/0011188 A1 | 1/2017 | Arshad et al. | |
| 2017/0011192 A1 | 1/2017 | Arshad et al. | |
| 2017/0011193 A1 | 1/2017 | Arshad et al. | |
| 2017/0011194 A1 | 1/2017 | Arshad et al. | |
| 2017/0011195 A1 | 1/2017 | Arshad et al. | |
| 2017/0011196 A1 | 1/2017 | Arshad et al. | |
| 2017/0011200 A1 | 1/2017 | Arshad et al. | |

FOREIGN PATENT DOCUMENTS

| | | | |
|---|---|---|---|
| CN | 104436656 A | 3/2015 | |
| CN | 105391795 A | 3/2016 | |
| CN | 105468443 | 4/2016 | |
| CN | 105468443 A | 4/2016 | |
| CN | 106033487 | 10/2016 | |
| CN | 106823376 A | 6/2017 | |
| JP | 2002-239245 | 8/2002 | |
| JP | 2007-260355 A | 10/2007 | |
| JP | 2009-213737 | 9/2009 | |
| JP | 2009233268 | 10/2009 | |
| JP | 2012-223583 | 11/2012 | |
| JP | 2012-245152 A | 12/2012 | |
| JP | 2013-532008 | 8/2013 | |
| JP | 2015-511155 | 4/2015 | |
| JP | 2016-187432 | 11/2016 | |
| WO | WO-2008049871 A1 * | 5/2008 | G07F 17/32 |

OTHER PUBLICATIONS

Written Opinion dated Apr. 18, 2018 in International Application No. PCT/CN2018/072981.
Combined Office Action and Search Report dated Oct. 29, 2019 in Chinese Patent Application No. 201710060151.X (with Concise English language translation), p. 1-7.
Extended European Search Report dated Oct. 23, 2019 in Patent Application No. 18743984.9, p. 1-7.
Japanese Office Action Issued in Application JP2019-528904 dated Jul. 6, 2020, with concise English Translation (7 pages).
Japanese Office Action Issued in Japanese Patent Application No. 2019-528904 dated Feb. 22, 2021, with English translation, (5 pages).

* cited by examiner

METHOD FOR IMPLEMENTING USER MATCHING AND RELATED DEVICE

RELATED APPLICATION

This application is a continuation of U.S. Ser. No. 16/411,676, filed on May 14, 2019, which is a continuation of International Application No. PCT/CN2018/072981, filed on Jan. 17, 2018, which claims priority to Chinese Patent Application No. 201710060151.X, filed on Jan. 24, 2017. The entire disclosures of the prior applications are hereby incorporated by reference in their entirety.

FIELD OF THE TECHNOLOGY

The present disclosure relates to the field of Internet technologies, and in particular, to a method and an apparatus for implementing user matching.

BACKGROUND OF THE DISCLOSURE

In some application programs, different users need to be matched into a same group. For example, in a multi-player battle game application program, first, different users need to be matched into a group according to a particular policy to battle against each other. In related technologies, each application that requires a matching process needs an independently developed matching procedure. However, for a platform with different types of application programs, developing an individual matching system respectively for the different application program is less universal and can cause relatively high implementation costs. If an application program on the platform is changed, for example when a new playing mode is added to a game application program on a game platform, the matching system of this application program needs to be modified, which limits expansibility.

SUMMARY

The present disclosure provides a method and an apparatus for implementing user matching, to resolve a technical problem in the related technologies that the related user matching methods have a relatively poor universality, a relatively insufficient expansibility, and a relatively high implementation cost.

To resolve the aforementioned problem, the present disclosure provides the following technical solution.

Aspects of the disclosure provide a method for user matching. In the method, a matching request is received by processing circuitry of an apparatus from a client. The matching request includes an application identifier and a user identifier. When the application identifier indicates that a matching mode for the matching request is an asynchronous mode, a matching queue identifier is obtained by the processing circuitry based on the matching request, the user identifier is added by the processing circuitry to a matching queue corresponding to the matching queue identifier, a predetermined number of user identifiers is selected by the processing circuitry from the matching queue, a matching result that includes an identifier of a matching group of the selected predetermined number of user identifiers is generated by the processing circuitry, and the matching result is sent by the processing circuitry to the client. Further, the predetermined number of user identifiers includes the user identifier in the matching request.

In an embodiment, when the application identifier indicates that the matching mode for the matching request is a synchronous mode, a group identifier is obtained by the processing circuitry based on the application identifier in the matching request, the group identifier and the user identifier are sent by the processing circuitry to an application server, and the group identifier is sent by the processing circuitry to the client.

In an embodiment, when the application identifier indicates that the matching mode for the matching request is the asynchronous mode, user information corresponding to candidate user identifiers in the matching queue is obtained by the processing circuitry, a candidate user identifier group that includes the candidate user identifiers corresponding to the user information that satisfies a preset condition is generated by the processing circuitry, and the predetermined number of user identifiers is selected from the candidate user identifiers included in the candidate user identifier group.

In an embodiment, when the application identifier indicates that the matching mode for the matching request is the asynchronous mode and the matching result is not generated within a preset time period, a virtual user identifier of a virtual user is added by the processing circuitry to the matching queue that corresponds to the matching queue identifier, and the predetermined number of user identifiers is selected from the matching queue that includes the virtual user identifier.

In an embodiment, when the application identifier indicates that the matching mode for the matching request is the asynchronous mode, the matching results is sent to the client by pushing the matching result to the client after the matching result is generated or sending the matching result to the client in response to a result query request from the client.

In an embodiment, when the application identifier indicates that the matching mode for the matching request is the asynchronous mode, the matching result is sent to an application server.

In an embodiment, when the application identifier indicates that the matching mode for the matching request is the synchronous mode, the group identifier, the user identifier, and other user identifiers associated with the group identifier are sent to the application server.

Aspects of the disclosure further provide an apparatus for implementing user matching. The apparatus includes a communication interface and processing circuitry. The communication interface is configured to receive a matching request from a client. The matching request includes an application identifier and a user identifier. The processing circuitry is configured to, when the application identifier indicates that a matching mode for the matching request is an asynchronous mode, obtain a matching queue identifier based on the matching request, add the user identifier to a matching queue corresponding to the matching queue identifier, select a predetermined number of user identifiers from the matching queue, generate a matching result that includes an identifier of a matching group of the selected predetermined number of user identifiers, and send the matching result to the client. Further, the predetermined number of user identifiers includes the user identifier in the matching request.

In an embodiment, when the application identifier indicates that the matching mode for the matching request is a synchronous mode, the processing circuitry is configured to obtain a group identifier based on the application identifier in the matching request, send the group identifier and the user identifier to an application server, and send the group identifier to the client.

In an embodiment, when the application identifier indicates that the matching mode for the matching request is the asynchronous mode, the processing circuitry is configured to obtain user information corresponding to candidate user identifiers in the matching queue, generate a candidate user identifier group that includes the candidate user identifiers corresponding to the user information that satisfies a preset condition, and select the predetermined number of user identifiers from the candidate user identifiers included in the candidate user identifier group.

In an embodiment, when the application identifier indicates that the matching mode for the matching request is the asynchronous mode and when the matching result is not generated within a preset time period, the processing circuitry is configured to add a virtual user identifier of a virtual user to the matching queue that corresponds to the matching queue identifier, and select the predetermined number of user identifiers from the matching queue that includes the virtual user identifier.

In an embodiment, when the application identifier indicates that the matching mode for the matching request is the asynchronous mode, the processing circuitry is configured to push the matching result to the client to the client after the matching result is generated, or send the matching result to the client in response to a result query request from the client.

In an embodiment, when the application identifier indicates that the matching mode for the matching request is the asynchronous mode, the processing circuitry is configured to send the matching result to an application server.

In an embodiment, when the application identifier indicates that the matching mode for the matching request is the synchronous mode, the processing circuitry is configured to send the group identifier and other user identifiers associated with the group identifier to the application server.

Aspects of the disclosure can further provide a non-transitory computer readable medium storing instructions which, when executed by a processor, cause the processor to perform the methods for user matching, as described above.

DESCRIPTION OF EMBODIMENTS

To make the objectives, features, and advantages of the present disclosure more comprehensible, some embodiments of the present disclosure are further described in detail below with figures and specific implementations.

In some application programs, different users need to be matched into a same group. For example, in a multi-player battle game application program, first, different users need to be matched into a group according to a particular policy to battle against each other. In related technologies, due to inconsistency of matching procedures and matching strategies of different games, different matching solutions need to be designed and implemented for different games appropriately, which is very challenging to develop a unified matching procedure on a plurality of different types of game platforms. Therefore, some embodiments of the present disclosure provide a method and an apparatus for implementing user matching and provide a universal and unified matching solution which is compatible with different types of game applications. This matching solution can support both a synchronous matching procedure and an asynchronous matching procedure, and provide a universal matching approach and procedure to some application programs, such as chess games, casual games, and battle games. Therefore, the matching solution can have a relatively good universality and expansibility.

Figure 1:
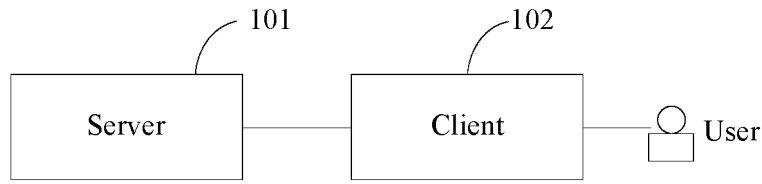
FIG. 1 is a schematic diagram of an application scenario according to an embodiment of the present disclosure.

FIG. 1 is a schematic diagram of an exemplary application scenario according to an embodiment of the present disclosure. A user can interact with a server 101 which provides a network application service through a client 102, which is installed on user equipment.

A person skilled in the art can understand that, the schematic diagram in FIG. 1 is an exemplary implementation of the present disclosure. An application scope of the implementation of the present disclosure is not limited by any aspect of the schematic diagram in the FIG. 1. It should be understood that, the user equipment can be any user device that is available at present, being researched and developed, or to be researched and developed in the future, and that can implement interaction between the client 102 on the user equipment and the server 101 through a wired and/or wireless connection in any form (for example, Wi-Fi, a LAN, a cellular network, and a coaxial cable). The user equipment includes, but is not limited to, a smartphone, a feature phone, a tablet computer, a laptop personal computer, a desktop personal computer, a small computer, a medium computer, and a large computer that are available at present, being researched and developed, or to be researched and developed in future. It should be further understood that, the server 101 can be any device that can provide an application service to a user, which can be available at present, being researched and developed, or to be researched and developed in the future. The implementation of the present disclosure is not limited in any aspect.

Figure 2:
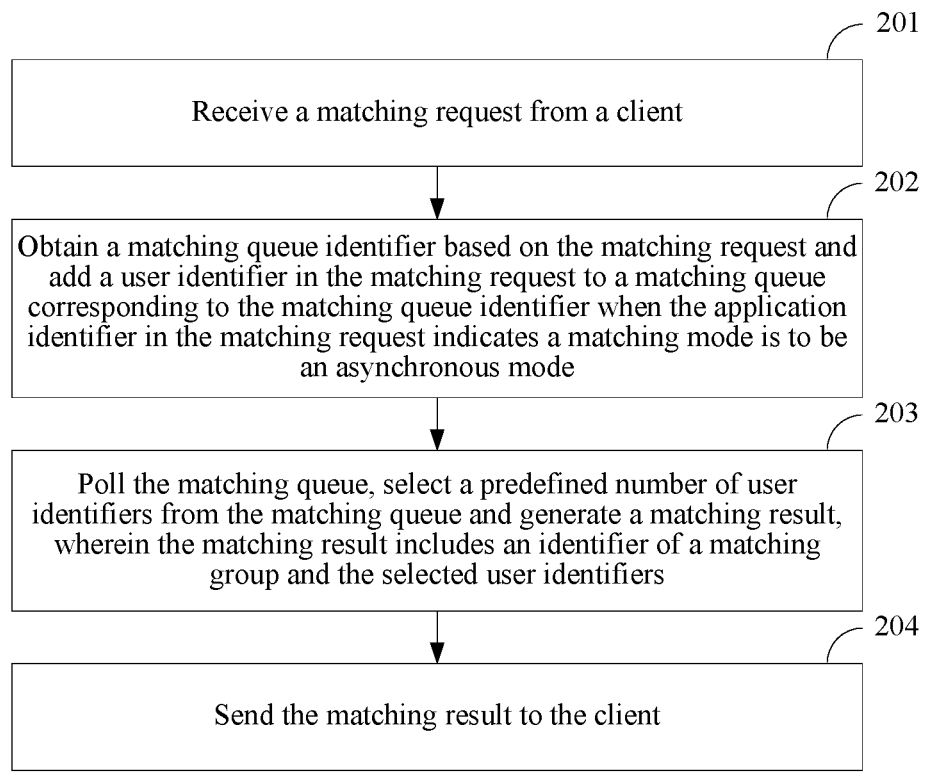
FIG. 2 is a flowchart of an embodiment of a method for implementing user matching according to embodiments of the present disclosure.

FIG. 2 is an exemplary flowchart of a method for implementing user matching according to an embodiment of the present disclosure. This embodiment can be described from a perspective of an apparatus, and the apparatus can be installed in a server. This embodiment includes the following steps.

In step 201, the server receives a matching request sent by a client.

A user can send a matching request from the client to the server if the user needs to perform user matching when an application program starts. According to different types of application programs, a matching procedure in the present disclosure can be classified into a synchronous matching mode or an asynchronous matching mode. In the asynchronous matching mode, there exists a waiting process for a user. Specifically, the user can wait for a new user to join the application program, and enter the application program when a plurality of users is matched together. For example, a multi-player battle game application program is utilizes an asynchronous matching mode. One or more users can be matched into one group according to a preset rule and then join the game. In this embodiment, the asynchronous matching mode is first described. For the synchronous matching mode, no matching waiting process is needed for a user. The user can enter an application program immediately. For example, when the application program is a game application program in which the user and a banker (that is, a game system) battle against each other, then the matching is in the synchronous matching mode. The user can join the game immediately after sending a matching request. The synchronous matching mode is described in a subsequent embodiment.

In step 202, the server obtains a matching queue identifier from the matching request and adds a user identifier in the matching request to a matching queue which corresponds to the matching queue identifier when a matching mode is identified to be an asynchronous matching mode according to an application identifier in the matching request.

The matching request may include the application identifier. The application identifier is used to identify the matching mode. The server may determine, according to the application identifier, whether the matching mode is an asynchronous matching mode or a synchronous matching mode. For example, "1" represents an asynchronous matching mode, and "0" represents a synchronous matching mode. In the embodiment, a matching queue is set for an application program in an asynchronous matching mode. At least one matching queue is set for each application program according to an actual matching requirement. Each of the at least one matching queues has a matching queue identifier. A quantity of the matching queues is not limited in an actual implementation.

Figure 3:
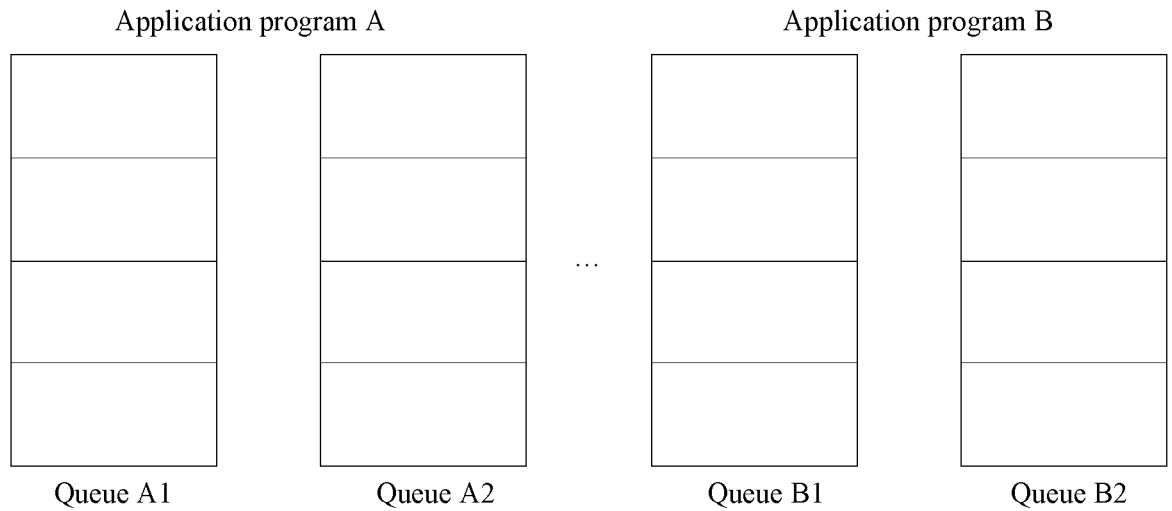
FIG. 3 is a schematic diagram of a matching queue according to an embodiment of the present disclosure.

FIG. 3 is an exemplary schematic diagram of a matching queue. For example, a matching queue A1 (for example, a matching queue identifier is "A1") and a matching queue A2 (for example, a matching queue identifier is "A2") are set for an application program A and a matching queue B1 (for example, a matching queue identifier is "B1") and a matching queue B2 (for example, a matching queue identifier is "B2") are set for an application program B. In an embodiment of the disclosure, the application program A and the application program B may be battle game application programs. The matching queue A1 and the matching queue B1 may be matching queues of a one-versus-one playing mode, and the matching queue A2 and the matching queue B2 may be matching queues of a two-versus-two playing mode. It can be understood that, for the one-versus-one playing mode, two users can be selected from the corresponding matching queues to perform matching; and for the two-versus-two playing mode, four users can be selected from the corresponding matching queues to perform matching. It should be noted that, the matching queue may be set according to an actual situation and a form of the matching queue is not limited in the present disclosure. It should be noted that, in this embodiment of the present disclosure, the aforementioned matching queue identifier is an example which is provided for ease of description and does not limit the form of the matching queue identifier. For example, the matching queue identifier may alternatively be A 1V1, A 2V2, and the like, and is not specifically limited thereto.

When the matching mode is an asynchronous matching mode, a user may select one particular playing mode in a game application program. The playing mode in the game application program can have a respective matching queue. The matching queue has a matching queue identifier, and the matching request may carry the matching queue identifier. After the matching queue identifier is obtained from the matching request, the user identifier in the matching request may be added to the matching queue which corresponds to the matching queue identifier. The user identifier of the user that sends the matching request is added to the selected matching queue, to wait to be matched with other users.

In step 203, the server polls the matching queue, selects a preset quantity of user identifiers from the matching queue to perform matching, and generates a matching result. The matching result can include an identifier of a matching group and a user identifier in the matching group.

After the user sends the matching request, the user identifier is added to a corresponding matching queue, and the user may alternatively cancel the matching before the matching is completed. The user may send a matching cancellation request which includes the user identifier to the server, and the server may delete the user identifier which is included in the matching cancellation request from the matching queue, that is, user identifiers in the matching queue can be changed in real time.

In some embodiments of the disclosure, the server can select a preset quantity of user identifiers from the matching queue by polling, or otherwise referencing, the matching queue to perform matching. In an embodiment, only the preset quantity may be considered, and the preset quantity is associated with the matching queue. For example, a matching queue with a two-versus-two playing mode may need four users for matching. After the server obtains the preset quantity of user identifiers from the matching queue through the polling, the server can match these user identifiers into the same matching group to generate the matching result, thereby the matching speed can be increased.

In another embodiment, the server selecting a preset quantity of user identifiers from the matching queue to perform matching, and generating a matching result may include: obtaining user information that corresponds to the user identifiers in the matching queue, using the user identifiers corresponding to user information that satisfies a preset condition as a candidate user identifier group, selecting a preset quantity of user identifiers from the candidate user identifier group to perform matching, and generating the matching result. That is, when the preset quantity is considered, matching needs to be performed with reference to the user information. For example, in a two-versus-two playing mode, four users can be selected from a corresponding matching queue to perform matching, and user identifiers of users whose user levels satisfy a preset condition are grouped into a same matching group. Then the preset quantity of user identifiers can be selected according to the user information to perform matching and generate a matching result. Similar users may be grouped into the same matching group, so that the users can have better interaction with each other.

In some embodiments of the present disclosure, the following content may be further included.

When no matching result is generated within a preset time period, it indicates that a current quantity of user identifiers does not match a quantity of user identifiers required by a current playing mode. For example, when there are three user identifiers in a current matching queue but the matching queue is a matching queue of a two-versus-two playing mode which requires four user identifiers. To reduce waiting time of users that correspond to the three user identifiers, a user identifier of a virtual user can be added to the matching queue that corresponds to a matching queue identifier. When the matching queue is polled by a server, the server can select a preset quantity of user identifiers from the matching queue to perform matching, to generate a matching result.

For example, when no matching result is generated within the preset time period, that is, the waiting time of the user who spent the longest time waiting in a matching queue exceeds the preset time period, an artificial intelligence (AI) user may be added to the matching queue, that is, a user identifier of a virtual user can be added to the matching queue. Further, the matching queue can be polled by a server, and then the server can select a preset quantity of user identifiers from the matching queue to perform matching, to generate a matching result. In this case, the user identifiers in the matching group may include the user identifier of the virtual user, so that the waiting time of the users can be reduced.

In step 204, the server sends the matching result to a client that corresponds to the user identifier in the matching group.

In some embodiments of the present disclosure, the sending of the matching result to a client that corresponds to the user identifier in the matching group can further include:
pushing the matching result to the client to the client after the matching result is generated; or
sending the matching result to the client in response to a result query request from the client.

In one embodiment, the server may push the matching result to the client or the client may obtain the matching result through polling. Then the client can join the matching group in an application program according to the matching result.

In some embodiments of the present disclosure, at least one matching queue may be set for each application program according to an actual situation and a user may select a desired matching queue to join. Upon the reception of a matching request from the user, a server can add the user's identifier to the selected matching queue according to a matching queue identifier in the matching request. The server can further select a preset quantity of users from the matching queue by polling the matching queue and perform matching to generate a matching result, which provides a unified matching approach and procedure for different application programs. A new application program and a new usage mode in the application program may be expanded on an application program platform by adding a matching queue. For example, a new game application program is added to a game application program platform or a new playing mode is added to the game application program, so that user matching can have relatively good universality and expansibility, and implementation costs are reduced.

Figure 4:
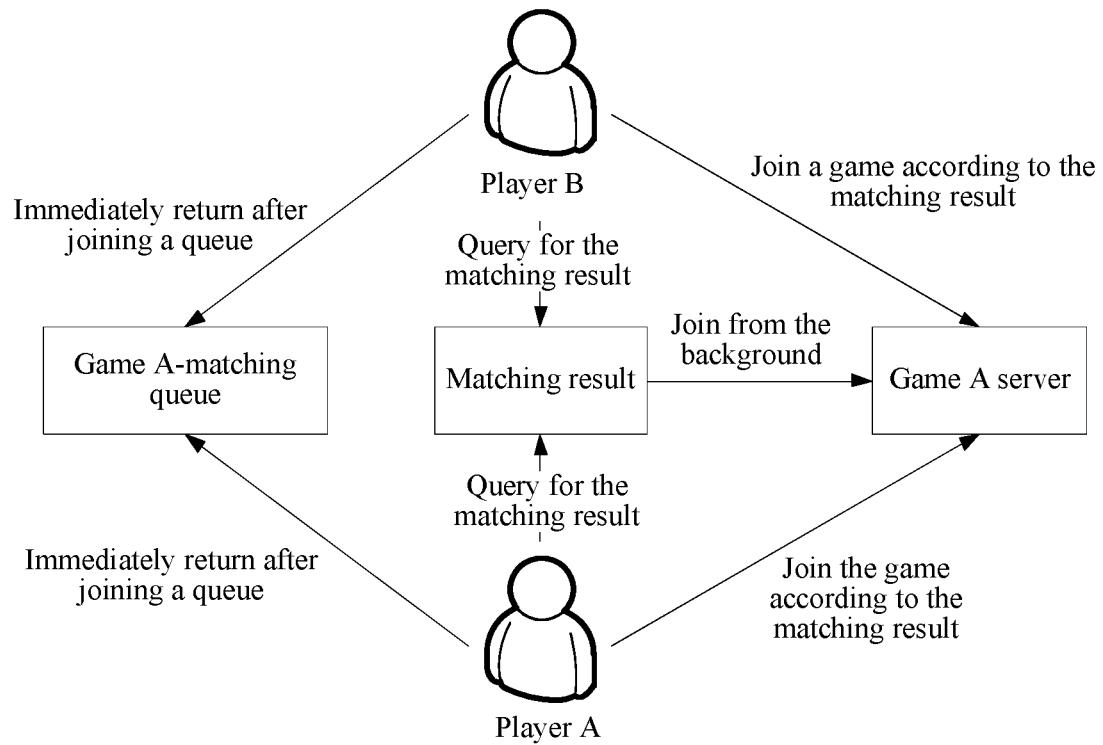
FIG. 4 is a schematic diagram of asynchronous matching according to an embodiment of the present disclosure.
Figure 5:
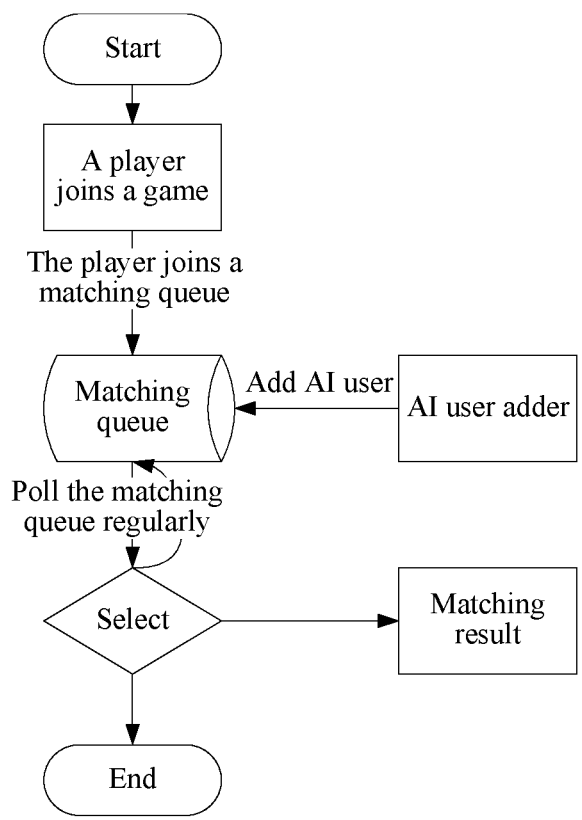
FIG. 5 is another schematic diagram of asynchronous matching according to an embodiment of the present disclosure.
Figure 6:
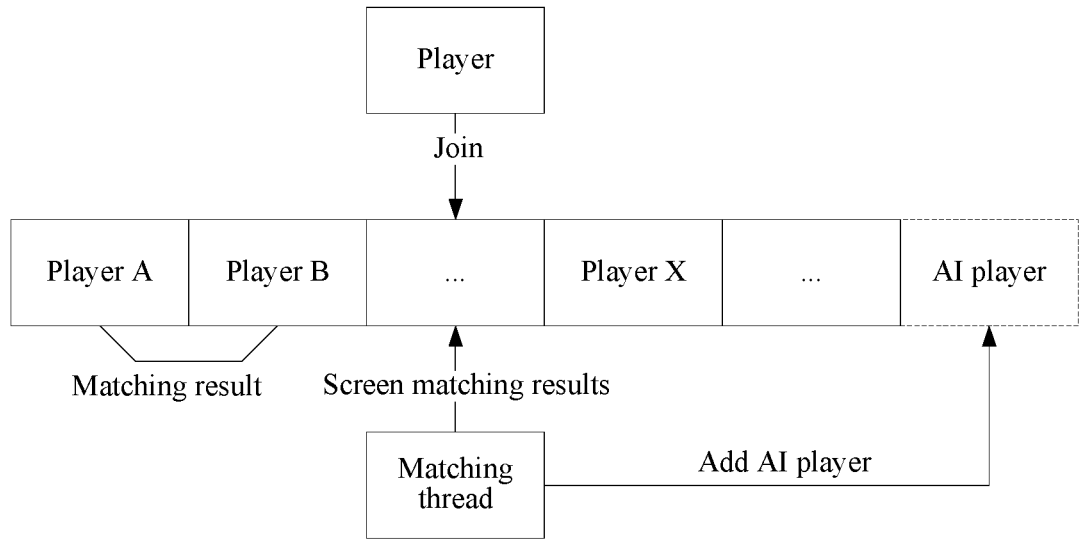
FIG. 6 is a schematic diagram of asynchronous matching according to an embodiment of the present disclosure.

Referring to FIG. 4 to FIG. 6, an exemplary game application program can be used to further describe the asynchronous matching mode for implementing user matching.

A user (i.e., a game player) may select a game playing mode when entering a game through a client, by triggering the client to send a matching request to a server. The matching request can include an application identifier, a user identifier, and a matching queue identifier. The server can add the user identifier to a corresponding matching queue, and then the client can immediately return from the server after sending the matching request. The server polls the matching queue by using a matching thread and select a preset quantity of user identifiers from the matching queue according to a particular rule (for example, a player waiting time and a player game level) to perform matching and generate a matching result. For example, when a user joins a queue of a one-versus-one playing mode, every two user identifiers are grouped into a same matching group. The matching groups have different matching group identifiers. The server can further trigger a game server to begin game initialization after completing the user matching, and send the matching result to the game server, so that the game server can establish the matching group, and obtain the user identifier in the matching queue. Then the server can join the game from the backend. The client further obtains the matching result through polling or through the server pushing the matching result to the client, and establishes a connection to the game server according to the matching group identifier in the matching result. Later, the user can join a corresponding matching group, and enter a game interface to begin a game. In addition, if the quantity of players is limited and the user matching cannot be completed within a preset time period, one or more AI users may further be added to the matching queue by using an AI adder, to complete the matching between users as soon as possible and reduce the waiting time of the users. Therefore, a game application platform can easily expand to a new game application program and/or a new playing mode by adding one or more matching queues. Therefore, the user matching can be more universal and more expandable, and implementation costs can be reduced.

Meanwhile, in some other embodiments of the disclosure, the method for implementing user matching can further provide a user matching process in a synchronous matching mode. That is, when the matching mode is identified to be a synchronous matching mode according to the application identifier in the matching request, the server can obtain a group identifier and send the group identifier to the client.

Figure 7:
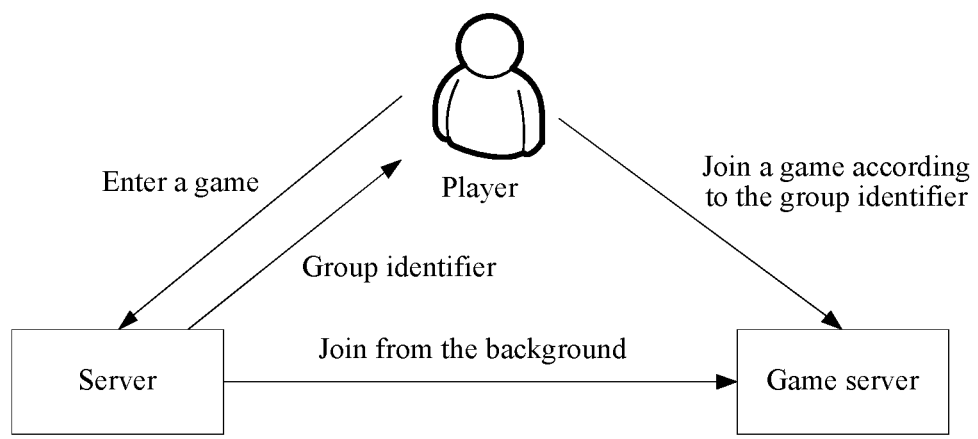
FIG. 7 is a schematic diagram of synchronous matching according to an embodiment of the present disclosure.
Figure 8:
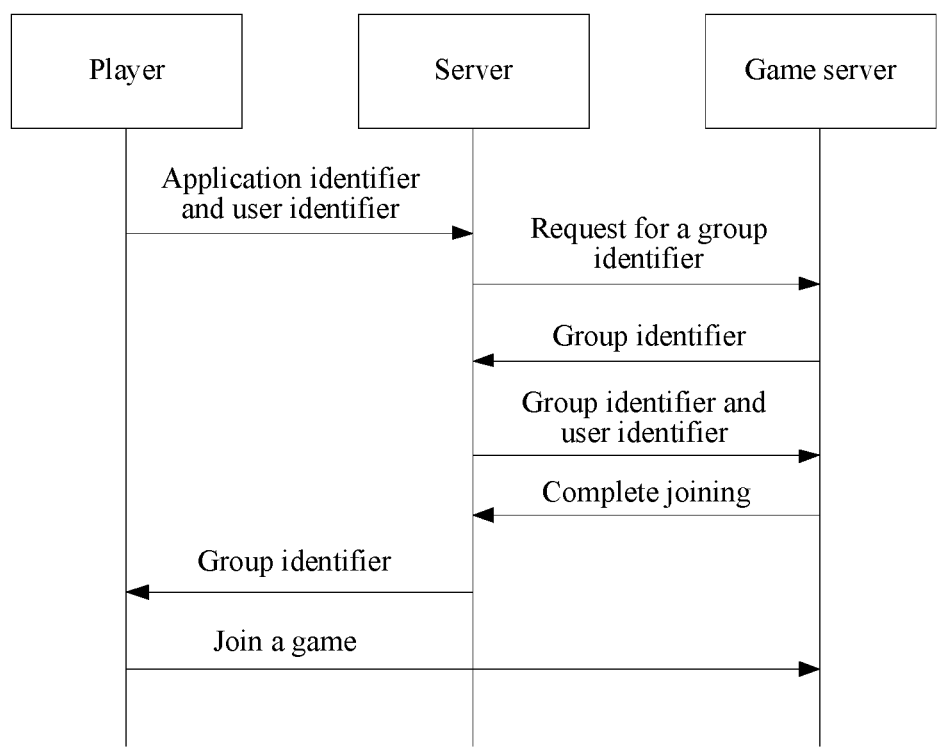
FIG. 8 is another schematic diagram of synchronous matching according to an embodiment of the present disclosure.

Referring to FIG. 7 and FIG. 8, an exemplary game application program is provided to describe the synchronous matching mode for implementing user matching in some embodiments of the present disclosure.

A user (i.e., a game player) can directly trigger a client to send a matching request to a server when the user enters a game through the client. The matching request can include an application identifier and a user identifier. The server can identify the matching mode to be a synchronous matching mode according to the application identifier. After the matching mode is identified to be a synchronous matching mode, the server can obtain game information, e.g., table information, from a game server, the table information may be regarded as a group identifier. Then, one or more users in a synchronous matching game may use the same table information to play a game with a banker at the same time. A plurality of table information may also be provided in the game at the same time. After obtaining the table information (i.e., the group identifier), the server can trigger the game server to begin game initialization, and send the user identifier and table information (i.e., the group identifier) to the game server, so that the server can join the game from the backend. After joining the game, the server can send the group identifier to the client, so that the client can join a corresponding table, and enter a game interface to begin a game. In this way, the user may enter the game interface directly without waiting for a matching process to complete the synchronous matching procedure.

Figure 9:
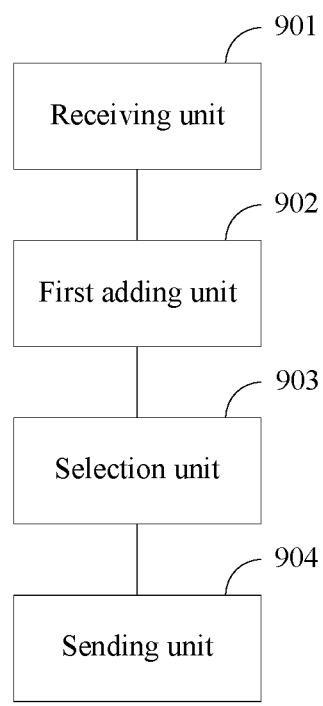
FIG. 9 is a schematic diagram of an embodiment of an apparatus for implementing user matching according to embodiments of the present disclosure.

In FIG. 9, an apparatus is provided for implementing user matching in some embodiments of the disclosure. The apparatus may include:
a receiving unit 901, configured to receive a matching request from a client, the matching request including an application identifier and a user identifier;

a first adding unit 902, configured to obtain a matching queue identifier based on the matching request and add the user identifier to a matching queue corresponding to the matching queue identifier when the application identifier indicates that a matching mode for the matching request is an asynchronous mode; and a selection unit 903, configured to select a predetermined number of user identifiers from the matching queue and generate a matching result. The matching result can include an identifier of a matching group.

In some embodiments of the present disclosure, the selection unit 903 may include:

a polling sub-unit, configured to poll the matching queue;

an acquisition sub-unit, configured to obtain information corresponding to candidate user identifiers in the matching queue; and a selection sub-unit, configured to generate a candidate user identifier group that includes the candidate user identifiers corresponding to the user information that satisfies a preset condition and select the predetermined number of user identifiers from the candidate user identifiers included in the candidate user identifier group.

The selection unit 903 may further be configured to poll the matching queue, obtain the user information that corresponds to the user identifiers in the matching queue, select user identifiers that corresponding to the user information that satisfies a predetermined condition to form the candidate user identifier group, select the preset quantity of user identifiers from the candidate user identifier group to perform matching, and generate the matching result.

A sending unit 904 is configured to send the matching result to a client corresponding to the user identifier in the matching group.

In some embodiments of the present disclosure, the sending unit 904 may include a first sending sub-unit or a second sending sub-unit.

The first sending sub-unit may be configured to push the matching result to the client in response to a result query request from the client.

The second sending sub-unit may be configured to send the matching result to the client in response to a result query request from the client.

In some other embodiments of the present disclosure, the apparatus for implementing user matching provided in this embodiment of the present disclosure may further include:

a second adding unit, configured to add, when the matching result is not generated within a preset time period, a virtual user identifier of a virtual user to the matching queue that corresponds to the matching queue identifier.

In some embodiments of the present disclosure, the apparatus for implementing user matching may further include:

an acquisition unit, configured to obtain a group identifier when the matching mode is identified to be a synchronous matching mode according to the application identifier of the matching request, and send the group identifier to the client.

In some embodiments of the present disclosure, one or more matching queues may be set for each application program according to an actual situation and a user may select a matching queue to join upon the reception of a matching request from the user. A server can add a user identifier of the user to the selected matching queue according to a matching queue identifier in the matching request. Further, the server can select a preset quantity of users from the matching queue by polling the matching queue, and perform matching to generate a matching result, which can provide a unified matching approach and procedure for different application programs. An application program platform can be easily expanded to include a new application program and/or a new usage mode in the application program by adding one or more matching queues. For example, a new game application program or a new playing mode can be added to a game application program, so that user matching can achieve relatively good universality and expansibility, and implementation costs can be reduced.

Figure 10:
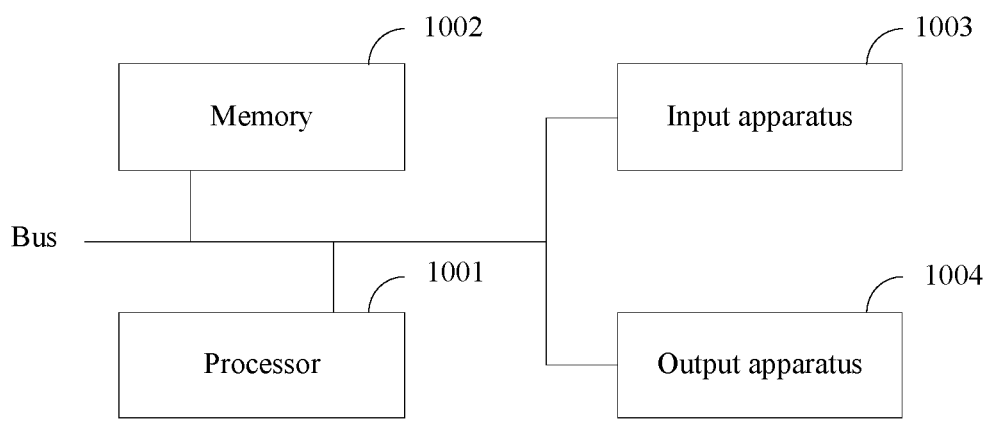
FIG. 10 is a schematic diagram of a server according to an embodiment of the present disclosure.

Some embodiments of the present disclosure further provide a server. As shown in FIG. 10, the server may include a processor 1001, a memory 1002, an input apparatus 1003, and an output apparatus 1004. There may be one or more processors 1001 in a user matching server. In the FIG. 10 example, one processor is used as an example. In some embodiments of the present disclosure, the processor 1001, the memory 1002, the input apparatus 1003, and the output apparatus 1004 may be connected by using a bus or in another approach. In FIG. 10, a bus is used to implement the connection.

The memory 1002 may be configured to store a software program and a module. The processor 1001 can run the software program and module stored in the memory 1002, to perform various functional applications and data processing of the user matching server. The memory 1002 may mainly include a program storage area and a data storage area. The program storage area may store an operating system, an application program of at least one function, or the like. In addition, the memory 1002 may include a high-speed random access memory, and may further include a non-volatile memory such as at least one magnetic disk storage device and a flash memory device, or a volatile solid storage device. The input apparatus 1003 may be configured to receive input digit or character information, and generate a key signal input related to a user setting and function control of the user matching server.

Specifically, in an embodiment of the disclosure, the processor 1001 can load, according to instructions, executable files of processes of one or more application programs into the memory 1002. The processor 1001 can further run the application programs stored in the memory 1002 to implement the program steps that are performed by the server in the aforementioned user matching method. Specifically, the processor 1001 is further configured to perform the following functions:

receiving a matching request from a client, the matching request including an application identifier and a user identifier;

obtaining a matching queue identifier based on the matching request;

adding the user identifier to a matching queue corresponding to the matching queue identifier;

selecting a predetermined number of user identifiers from the matching queue, the predetermined number of user identifiers including the user identifier in the matching request;

generating a matching result that includes an identifier of a matching group of the selected predetermined number of user identifiers; and sending the matching result to the client.

In an embodiment, the selecting a preset quantity of user identifiers from the matching queue to perform matching, and generating a matching result includes:

obtaining user information that corresponds to user identifiers in the matching queue;

selecting user identifiers corresponding to user information that satisfies a preset condition to form a candidate user identifier group;

selecting a preset quantity of user identifiers from the candidate user identifier group to perform matching; and generating the matching result.

In an embodiment, the method further includes:

adding, when no matching result is generated within a preset time period, a user identifier of a virtual user to the matching queue that corresponds to the matching queue identifier;

polling the matching queue;

selecting a preset quantity of user identifiers from the matching queue to perform matching; and generating the matching result.

In an embodiment, the sending the matching result to a client that corresponds to the user identifier in the matching group includes:

pushing the matching result to the client to the client after the matching result is generated; or sending the matching result to the client in response to a result query request from the client.

In an embodiment, the method further includes:

obtaining a group identifier when the matching mode is identified to be a synchronous matching mode according to the application identifier of the matching request; and sending the group identifier to the client.

Therefore, in some embodiments of the present disclosure, one or more matching queues may be set for each application program according to an actual situation and a user may select a matching queue to join, after a matching request input by the user is received. A server can add a user identifier of the user to the selected matching queue according to a matching queue identifier in the matching request. Further, the server can select a preset quantity of users from the matching queue by polling the matching queue, and perform matching to generate a matching result, which can provide a unified matching approach and procedure for different application programs. An application program platform can be more easily expanded to include a new application program and/or a new usage mode in the application program by adding one or more matching queues. For example, a new game application program or a new playing mode can be added to a game application program, so that user matching can achieve relatively good universality and expansibility, and implementation costs can be reduced.

An embodiment of the present disclosure further provides a computer storage medium (e.g., a non-transitory computer-readable storage medium), configured to store a computer software instruction used by the foregoing server and including a program designed to perform the method performed by the server in the foregoing method embodiment.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

It is noted that, the embodiments in this specification are described in a progressive approach. Descriptions of each embodiment focus on differences from other embodiments, and same or similar parts among respective embodiments may be mutually referenced. For the system or apparatus disclosed in the embodiments, the system or apparatus corresponds to the method disclosed in the embodiments, and therefore is described briefly, and reference may be made to the description of the method for a related part.

It is noted that the relational terms herein such as first and second are used only to differentiate an entity or operation from another entity or operation, and do not require or imply any actual relationship or sequence between these entities or operations. Moreover, the terms "include", "comprise", and any variants thereof are intended to cover a non-exclusive inclusion. Therefore, in the context of a process, a method, an object, or an apparatus that includes a series of elements, the process, method, object, or apparatus not only includes such elements, but also includes other elements not specified expressly, or may include inherent elements of the process, method, object, or apparatus. Unless otherwise specified, an element limited by "include a/an . . . " does not exclude other same elements existing in the process, the method, the article, or the device that includes the element.

The steps of the method or algorithm described with reference to the embodiments disclosed herein may be directly implemented by hardware, a software module performed by a process, or a combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM or a storage medium in any other form that is known in the technical field.

The above descriptions of the disclosed embodiments make a person skilled in the art implement or use the present disclosure. Various modifications to, and combinations of, these embodiments can be made by a person skilled in the art, and the general principles defined in this specification may be implemented in other embodiments without departing from the spirit and scope of the present disclosure. Therefore, the present disclosure is not limited to these embodiments illustrated in the present disclosure, but needs to conform to the broadest scope consistent with the principles and novel features disclosed in the present disclosure.

What is claimed is:

1. A method of user matching for a plurality of multiplayer game applications, the method comprising:

receiving, by processing circuitry of a matching system, a matching request for one of the plurality of multiplayer game applications, the matching request including an application identifier of the one of the plurality of multiplayer game applications and a user identifier of a user, the matching system being configured to concurrently manage matching queues for the plurality of multiplayer game applications, the application identifier indicating that a matching mode of the matching request is one of an asynchronous mode including a waiting process for the user to join the one of the plurality of multiplayer game applications or a synchronous mode not including the waiting process;

adding, by the processing circuitry and based on the application identifier, the user identifier to one of (i) a selected matching queue of the matching queues corresponding to the one of the plurality of multiplayer game applications or (ii) a game server;

generating matching information indicating a matching group to be joined by the user in the one of the plurality of multiplayer game applications; and sending the matching information for the user to join the matching group in the one of the plurality of multiplayer game applications.

2. The method according to claim 1, wherein the generating the matching information comprises:
selecting a predetermined number of user identifiers from the selected matching queue to include in the matching group, the predetermined number of user identifiers including the user identifier in the matching request.

3. The method according to claim 1, wherein a new matching queue is) added to the matching queues when a new multiplayer game application is added to the plurality of multiplayer game applications.

4. The method according to claim 1, wherein a new matching queue is added to the matching queues when a new playing mode is added to the one of the plurality of multiplayer game applications.

5. The method according to claim 1, wherein
the application identifier indicates that the matching mode for the matching request is the synchronous mode,
the generating the matching information includes generating the matching information based on a group identifier of the matching group, and
the sending includes (i) sending the group identifier and the user identifier to an application server or (ii) sending the group identifier to a client of the user.

6. The method according to claim 1, wherein
the application identifier indicates that the matching mode for the matching request is the asynchronous mode; and
the generating the matching information includes:
obtaining user information corresponding to candidate user identifiers in the selected matching queue, generating a candidate user identifier group that includes the candidate user identifiers corresponding to the user information that satisfies a preset condition, and
selecting a predetermined number of user identifiers from the candidate user identifiers included in the candidate user identifier group to include in the matching group.

7. The method according to claim 1, further comprising:
adding a virtual user identifier of a virtual user to the selected matching queue,
wherein the matching group includes the virtual user.

8. The method according to claim 1, wherein the sending comprises:
sending the matching information to a client of the user.

9. The method according to claim 1, wherein the sending comprises:
sending the matching information to an application server.

10. The method according to claim 1, wherein the application identifier indicates that the matching mode for the matching request is the synchronous mode, and
the sending the matching information includes sending the matching information that indicates a group identifier of the matching group and another user identifier associated with the group identifier to an application server.

11. A matching system configured to concurrently manage processing circuitry configured to:
matching queues for a plurality of multiplayer game applications, comprising:
receive a matching request for one of the plurality of multiplayer game applications, the matching request including an application identifier of the one of the plurality of multiplayer game applications and a user identifier of a user, the application identifier indicating that a matching mode of the matching request is one of an asynchronous mode including a waiting process for the user to join the one of the plurality of multiplayer game applications or a synchronous mode not including the waiting process,
add the user identifier based on the application identifier to one of (i) a selected matching queue of the matching queues corresponding to the one of the plurality of multiplayer game applications or (ii) a game server,
generate matching information indicating a matching group to be joined by the user in the one of the plurality of multiplayer game applications, and
send the matching information for the user to join the matching group in the one of the plurality of multiplayer game applications.

12. The matching system according to claim 11, wherein the processing circuitry is configured to:
select a predetermined number of user identifiers from the selected matching queue to include in the matching group, the predetermined number of user identifiers including the user identifier in the matching request.

13. The matching system according to claim 11, wherein a new matching queue is added to the matching queues when a new multiplayer game application is added to the plurality of multiplayer game applications.

14. The matching system according to claim 11, wherein a new matching queue is added to the matching queues when a new playing mode is added to the one of the plurality of multiplayer game applications.

15. The matching system according to claim 11, wherein the application identifier indicates that the matching mode for the matching request is the synchronous mode; and
the processing circuitry is configured to:
generate the matching information based on a group identifier of the matching group, and
(i) send the group identifier and the user identifier to an application server or (ii) send the group identifier to a client of the user.

16. The matching system according to claim 11, wherein the application identifier indicates that the matching mode for the matching request is the asynchronous mode; and
the processing circuitry is configured to:
obtain user information corresponding to candidate user identifiers in the selected matching queue,
generate a candidate user identifier group that includes the candidate user identifiers corresponding to the user information that satisfies a preset condition, and
select a predetermined number of user identifiers from the candidate user identifiers included in the candidate user identifier group to include in the matching group.

17. The matching system according to claim 11, wherein the processing circuitry is configured to add a virtual user identifier of a virtual user to the selected matching queue, and
the matching group includes the virtual user.

18. The matching system according to claim 11, wherein the processing circuitry is configured to:
send the matching information to a client of the user.

19. The matching system according to claim 11, wherein the processing circuitry is configured to:
send the matching information to an application server.

20. A non-transitory computer-readable storage medium storing instructions which when executed by a processor cause the processor to perform a method of a matching system, the method comprising:
receiving a matching request for one of a plurality of multiplayer game applications, the matching request including an application identifier of the one of the plurality of multiplayer game applications and a user identifier of a user, the matching system being configured to concurrently manage matching queues for the plurality of multiplayer game applications, the application identifier indicating that a matching mode of the matching request is one of an asynchronous mode including a waiting process for the user to join the one of the plurality of multiplayer game applications or a synchronous mode not including the waiting process;

adding the user identifier based on the application identifier to one of (i) a selected matching queue of the matching queues corresponding to the one of the plurality of multiplayer game applications or (ii) a game server;

generating matching information indicating a matching group to be joined by the user in the one of the plurality of multiplayer game applications; and sending the matching information for the user to join the matching group in the one of the plurality of multiplayer game applications.

* * * * *